United States Patent
Hui et al.

(10) Patent No.: US 9,769,821 B2
(45) Date of Patent: Sep. 19, 2017

(54) DATA RATE HOPPING SCHEDULING

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 451 days.

(21) Appl. No.: 14/270,972

(22) Filed: May 6, 2014

(65) Prior Publication Data

US 2015/0327260 A1 Nov. 12, 2015

(51) Int. Cl.
| | | |
|---|---|---|
| *H04W 72/04* | (2009.01) | |
| *H04L 1/00* | (2006.01) | |
| *H04B 1/7143* | (2011.01) | |
| *H04L 12/801* | (2013.01) | |
| *H04L 1/04* | (2006.01) | |

(52) U.S. Cl.
CPC ...... *H04W 72/0446* (2013.01); *H04B 1/7143* (2013.01); *H04L 1/0002* (2013.01); *H04L 1/0017* (2013.01); *H04L 1/04* (2013.01); *H04L 47/14* (2013.01)

(58) Field of Classification Search
CPC .... G06K 7/10; G06K 7/10881; H04B 1/7143; H04B 1/7156; H04L 1/00; H04W 8/245; H04W 72/04; H04W 72/0446
See application file for complete search history.

(56) References Cited

U.S. PATENT DOCUMENTS

| | | | |
|---|---|---|---|
| 5,696,903 A | 12/1997 | Mahany | |
| 7,583,637 B2 | 9/2009 | Lau et al. | |
| 8,630,269 B1 | 1/2014 | Chang et al. | |
| 2005/0063328 A1* | 3/2005 | Dunagan | H04W 8/245 370/324 |
| 2006/0233124 A1* | 10/2006 | Palanki | H04B 1/7143 370/319 |
| 2009/0168846 A1 | 7/2009 | Filippo, III et al. | |
| 2010/0074304 A1 | 3/2010 | Flammer, III | |
| 2013/0022084 A1 | 1/2013 | Vasseur et al. | |

FOREIGN PATENT DOCUMENTS

EP  1838013 A2  9/2007

OTHER PUBLICATIONS

Lee, et al., "Adaptive Power and Rate Transmission in Hybrid DS/FH CDMA Communications Over Fading Channels", International Journal of Smart Home. vol. 7, No. 5, Sep. 2013, pp. 75-82.
Winter, et al., "RPL: IPv6 Routing Protocol for Low-Power and Lossy Networks", Request for Comments 6550, Mar. 2012, 157 pages. Internet Engineering Task Force Trust.
International Search Report and Written Opinion mailed Jul. 17, 2015 in connection with PCT/US2015/028116.

* cited by examiner

*Primary Examiner* — Andrew Lai
*Assistant Examiner* — Leon Andrews
(74) *Attorney, Agent, or Firm* — Parker Ibrahim & Berg LLC; James M. Behmke; Stephen D. LeBarron (57) ABSTRACT

In one embodiment, a plurality of data rates available for communication is identified at a first device in a network. Slots of a channel hopping schedule are also identified and the data rates are assigned to the slots of the channel hopping schedule to generate a data rate hopping schedule. The generated data rate hopping schedule is further provided to a second device in the network.

22 Claims, 11 Drawing Sheets

DATA RATE HOPPING SCHEDULING

TECHNICAL FIELD

The present disclosure relates generally to computer networks, and, more particularly, to using a data rate hopping schedule in a computer network, such as a mesh network.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like also present unique challenges to LLNs.

A tradeoff exists when selecting a data rate to be used by an LLN device. In particular, selecting a lower data rate allows for an increased communication range and greater message reliability. Conversely, selecting a higher data rate allows for greater throughput and lower latency. Typical LLN solutions take a "one-size-fits-all" approach to data rate selection. In other words, a network device typically configures a single data rate at which the device is to receive data by selecting a data rate that balances these competing factors. All neighboring devices communicating with the device must then use that data rate when transmitting packets to the network device. In limited cases, the device may change the data rate and notify its neighbors of the change. However, this still requires all neighboring devices to communicate with the device using the same data rate.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a plurality of data rates available for communication is identified at a first device in a network. Slots of a channel hopping schedule are also identified and the data rates are assigned to the slots of the channel hopping schedule to generate a data rate hopping schedule. The generated data rate hopping schedule is further provided to a second device in the network.

In another embodiment, a device in a network receives a data rate hopping schedule for a neighboring device. The device identifies a data packet to send to the neighboring device. The device also selects one or more data rates from the data rate hopping schedule to send the packet to the neighboring device.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
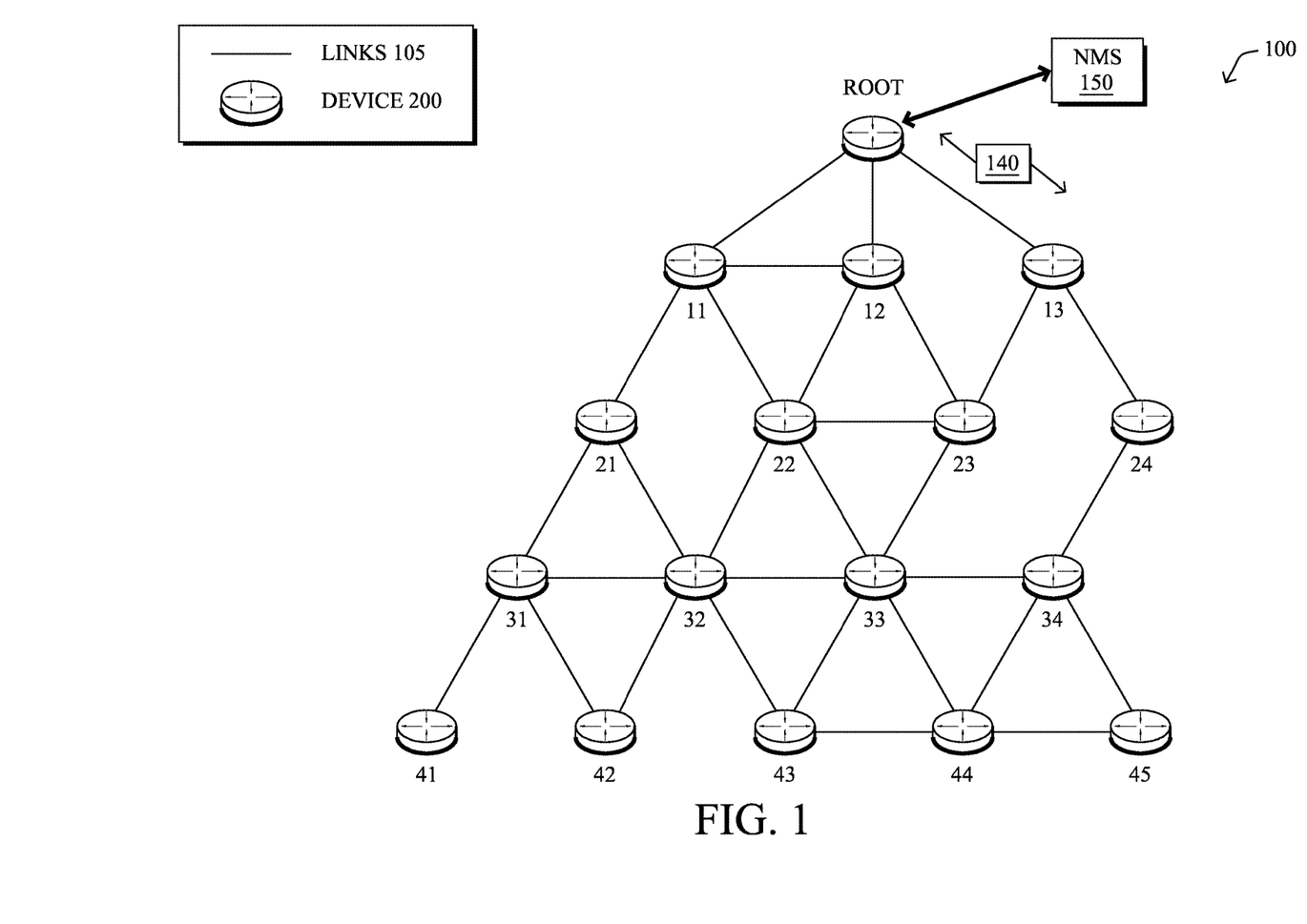
FIG. 1 illustrates an example communication network.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
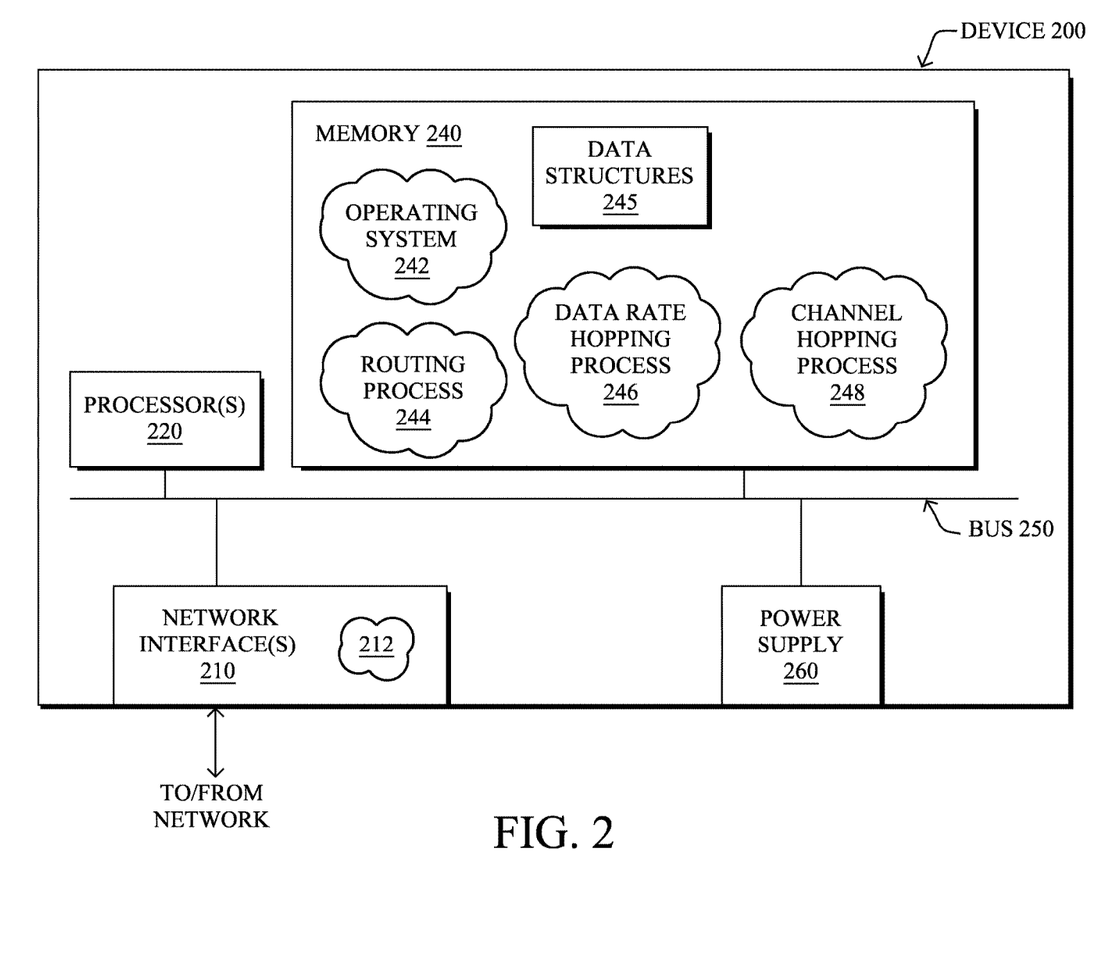
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art, particularly for frequency-hopping communication as described herein. In addition, the interfaces 210 may comprise an illustrative media access control (MAC) layer module 212 (and other layers, such as the physical or "PHY" layer, as will be understood by those skilled in the art). Note, further, that the nodes may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a channel hopping process 248, and an illustrative data rate hopping process 246, as described herein. Note that while channel and data rate hopping processes 246, 248 are shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

As noted above, existing LLN devices typically use a fixed data rate set by the receiver when a device receives messages from neighboring devices. Such a data rate is often selected to balance the tradeoffs of using a lower data rate (e.g., extended range, increased message reliability, etc.) versus a higher data rate (e.g., greater throughput, lower latency, etc.). In some cases, the data rate used by a receiving device is fixed and does not change. In more limited cases, the data rate used by a receiving device may be changed dynamically, but is still set across all neighboring devices.

Data Rate Hopping Scheduling

The techniques herein propose a mixed data rate operation that may be used by devices in a network, such as a Smart Grid AMI mesh network. In particular, a data rate hopping function is introduced that determines what data rate to receive on each slot of a data rate hopping schedule. Arbitrary data rate ratios may also be used by a device (e.g., by storing the ratio of data rates in a data rate hopping ratio table). In some implementations, the data rate hopping schedule may be dynamically updated by the data rate hopping function based on local observations, communication with neighboring devices, by a central device, such as a field area router or network management server (NMS). Any such updates to the data rate hopping schedule may be either proactively or reactively sent to neighbors of the receiving device and/or to a path computation engine or NMS. Neighboring devices may also dynamically select which data rate(s) to use when transmitting packets to a neighboring device based on policies that minimize channel use.

Specifically, according to one or more embodiments of the disclosure as described in detail below, a plurality of data rates available for communication is identified at a first device in a network. Slots of a channel hopping schedule are also identified and the data rates are assigned to the slots of the channel hopping schedule to generate a data rate hopping schedule. The generated data rate hopping schedule is further provided to a second device in the network.

Illustratively, the techniques described herein may be performed by hardware, software, and/or firmware, such as in accordance with the scheduling processes 246, 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional wireless communication protocols, such as the IEEE 802.11 protocol, IEEE 802.15.4, WiFi, etc., and as such, would be processed by similar components understood in the art that execute such protocols, accordingly.

Operationally, a mixed data rate operation in the time domain may be used by a network device/node, allowing a given device to hop between different data rates over time. By receiving on different data rates, a single device can support high data rate communication from some neighbors and low data rate from other neighbors.

Figure 3:
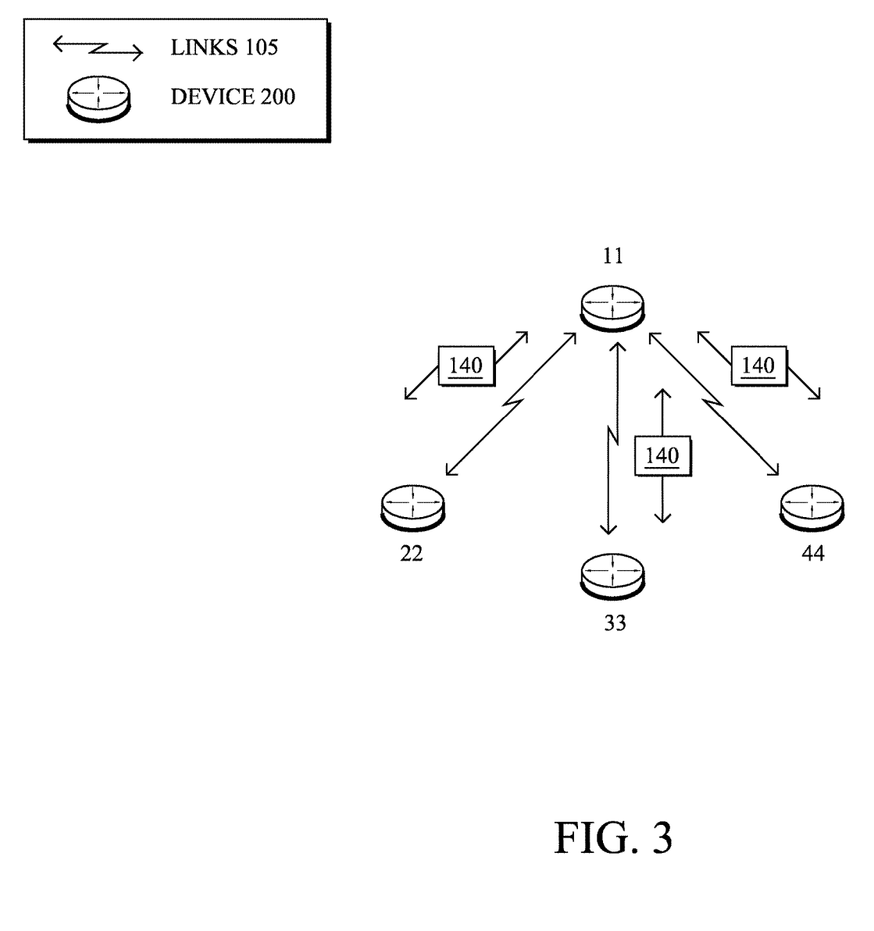
FIG. 3 illustrates an example of a network device/node communicating with neighboring devices.

FIG. 3 illustrates an example of a network node/device 11 communicating with its neighboring nodes/devices 22, 33, and 44. According to various embodiments, devices 11, 22, 33, and 44 utilize frequency hopping to communicate wirelessly. In general, frequency-hopping, also referred to as "frequency-hopping spread spectrum" (FHSS) or channel hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

During operation, device 11 configures its receiver to follow a channel hopping schedule by picking a channel sequence, duration of each time slot, and time base that defines when the first slot in the schedule begins. To then communicate a packet, the transmitter and receiver must be configured to the same channel during the packet transmission. For example, neighboring device 22 must be configured to use the same channel hopping schedule as device 11, when sending a data packet 140 to device 11.

All devices in a given network may utilize the same channel hopping schedule (i.e., all devices in network 100 are configured to use the same channel sequence, time slot duration, and a common time base), resulting in a network where all communication in the network at any given point in time utilizes the same channel. Alternatively, each transmitter-receiver pair may utilize different channel hopping schedules (i.e., each pair may differ in channel sequence, time slot duration, and/or time base), such that transmitter-receiver pairs may communicate at the same time but on different channels within network 100.

Figure 4:
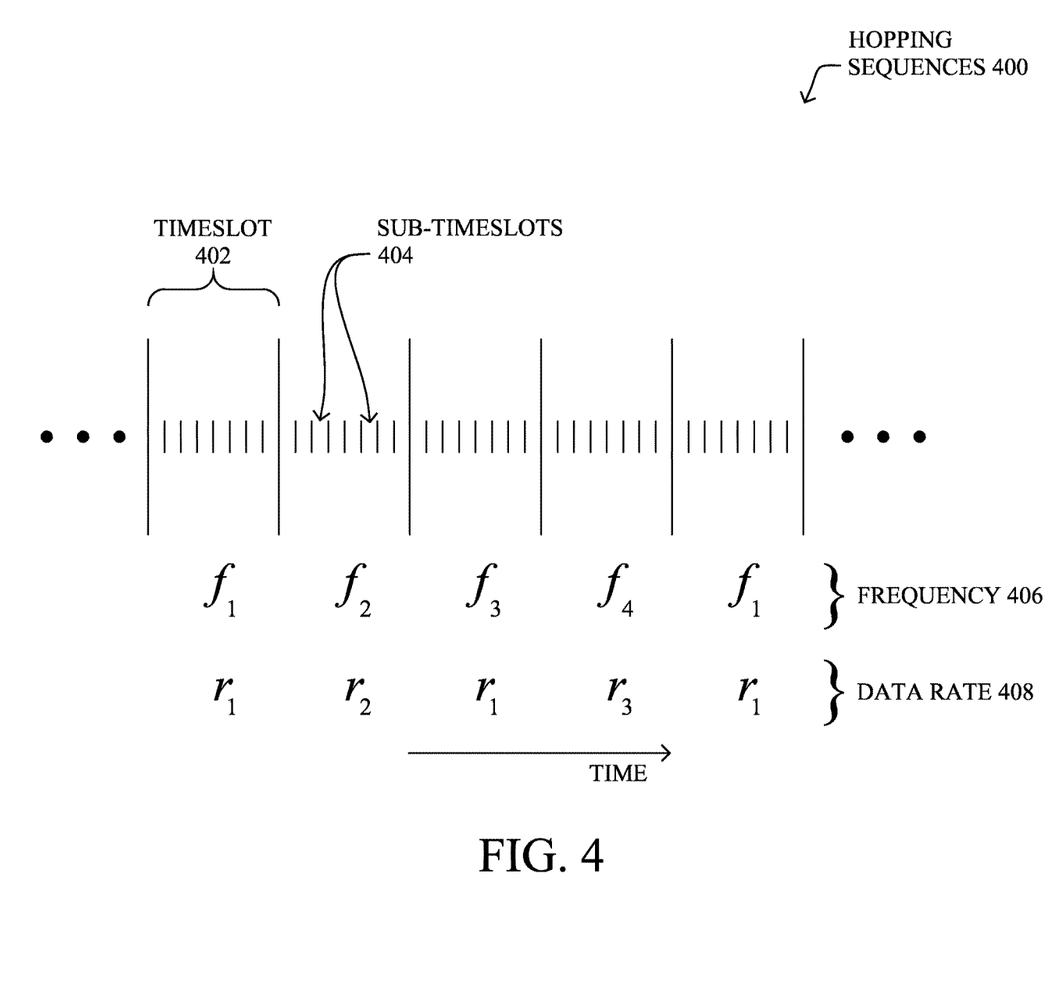
FIG. 4 illustrates example channel and data rate hopping schedules.

Referring now to FIG. 4, example channel and data rate hopping schedules are illustrated, according to some embodiments. As shown, transmission time frames are divided into regular timeslots 402, each one operating on a different frequency 406 (e.g., $f_1$-$f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 402 may be further divided into sub-timeslots 404. Note that not all frequency-hopping systems use sub-timeslots, and devices can begin transmission at any time within a timeslot; the view herein is merely one example. Illustratively, the MAC layer 212 is in charge of scheduling the timeslot in which a packet is sent, the main objective of which generally being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

Thus, frequencies 406 may be assigned to each of timeslots 402 to form a channel hopping schedule. The channel hopping schedule is determined by a channel hoping function, such as channel hopping process 248. In one implementation, the channel hopping schedule is based on the Jenkins Hash function. For example, channel hopping process 248 may receive the device's unique identifier (i.e. EUI-64) and slot ID as inputs. The channel is then computed by HASH(eui64,slot) % NUM_CHANNELS, where NUM_CHANNELS is the number of available channels in channel plan. For example, the US ISM 902-928 band with 400 kHz spacing has sixty four different channels available.

According to various embodiments, a data rate may also be assigned to each slot in the channel hopping schedule, to generate a data rate hopping schedule. For example, data rates 408 (e.g., data rates $r_1$-$r_3$) may be assigned to time slots 402 by data rate hopping process 246 to form a data rate hopping schedule. Data rate hopping process 246 may generate a data rate hopping schedule in any number of ways. In one embodiment, the data rate hopping function used by data rate hopping process 246 is simply (slot % NUM_DATA_RATES), where NUM_DATA_RATES is the number of data rates being used in the schedule. The advantage of this approach is that the time between data rate slots is fixed, making communication delays more deterministic and easier to reason about. However, the fixed spacing is also a disadvantage in that it is not as robust to internal and external interference that also experiences a periodic pattern. In one embodiment, a particular data rate may be assigned to the slots of the channel hopping schedule at periodic time intervals.

In another embodiment, the data rate hopping function used by data rate hopping process 246 to generate a data rate hopping schedule is based on a pseudorandom function. The pseudorandom function may be based on a field (e.g. Galois) generator that ensures running through each data rate at least once before repetition. The pseudorandom function may also be based on the Jenkins Hash function in a manner similar to the formation of the channel hopping schedule. An advantage of using pseudorandom functions is that it adds jitter to the data rate hopping schedule, allowing it to be more robust to periodic internal and external interference. A disadvantage is that the timing becomes less deterministic. Using Galois fields can bound the maximum delay between repeated use of a given data rate. Using the Jenkins Hash provides a purely probabilistic approach.

An arbitrary ratio of slots used for each data rate may also be supported by a given device. Thus, another layer of indirection may be added between the output of the data rate hopping function and the actual data rate used. In a first component, the data rate hopping function of data rate hopping process 246 may output an index that identifies which data rate to use. In some cases, more than one index may be used to identify a particular data rate. A data rate hopping table that maps an index to a data rate may also be stored (e.g., as part of data structures 245). For example, if two thirds of the time slots are to use a 50 kbps data rate and the remaining one third of slots are to use 200 kbps, index [0,1] may be assigned to the 50 kbps data rate and index [2] to 200 kbps. In such a case, the data rate hopping function outputs an index in the range [0,2].

As would be appreciated, the above frequency hopping scheduling approach differs significantly from other network schemes that support two or more data rates. For example, in the case of a cellular network, a user device may have the ability to select its own data rate when communicating with a relatively capable base station. In contrast, devices in mesh networks may have significantly limited communication capabilities. For example, LLN devices using IEEE 802.15.4g-2012 with FSK can only communicate (transmit/receive) on a single channel at a time at a specific data rate. Accordingly, an LLN device alternating between X and Y data rates as part of a data rate hopping schedule thereby requires its neighboring devices to use X data rate on the even slots and Y data rate on the odd slots when communicating with the LLN device.

Figure 5A:
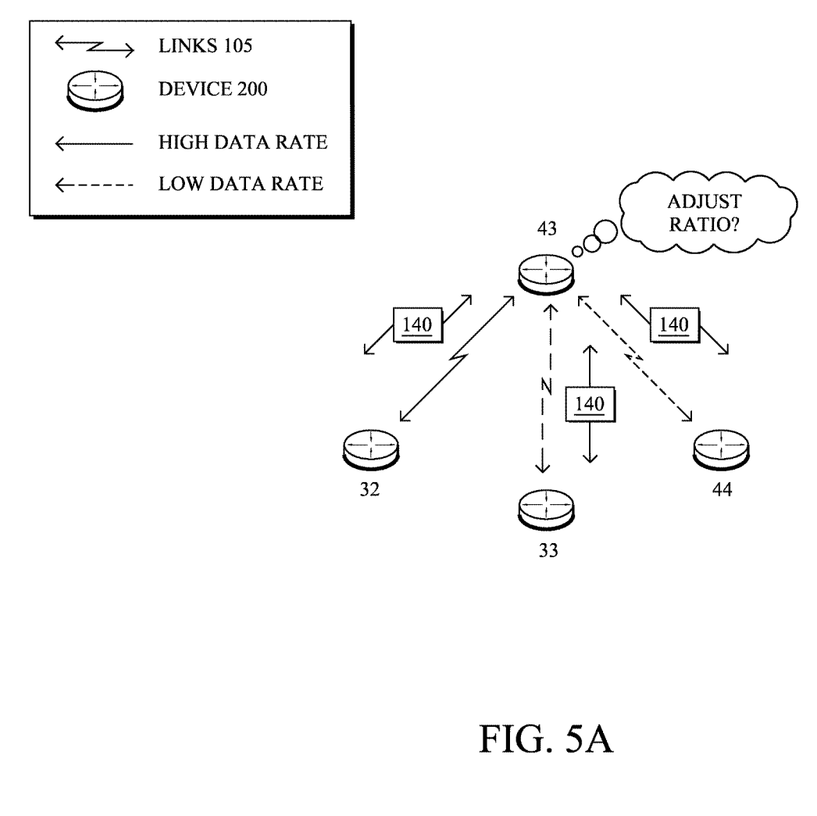
FIGS. 5A-5C illustrate an example of a device/node adjusting its data rate schedule.
Figure 5B:
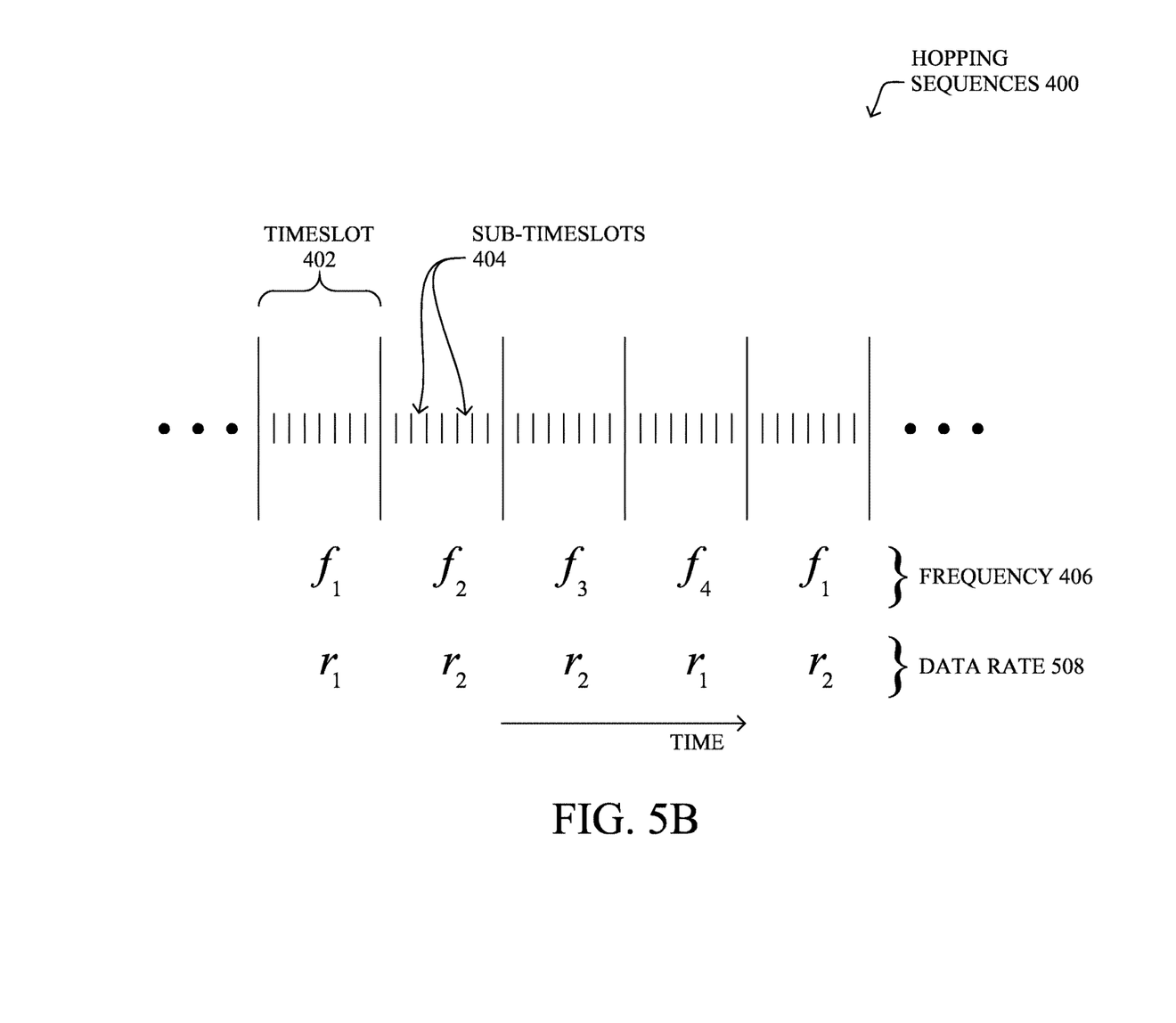
Figure 5C:
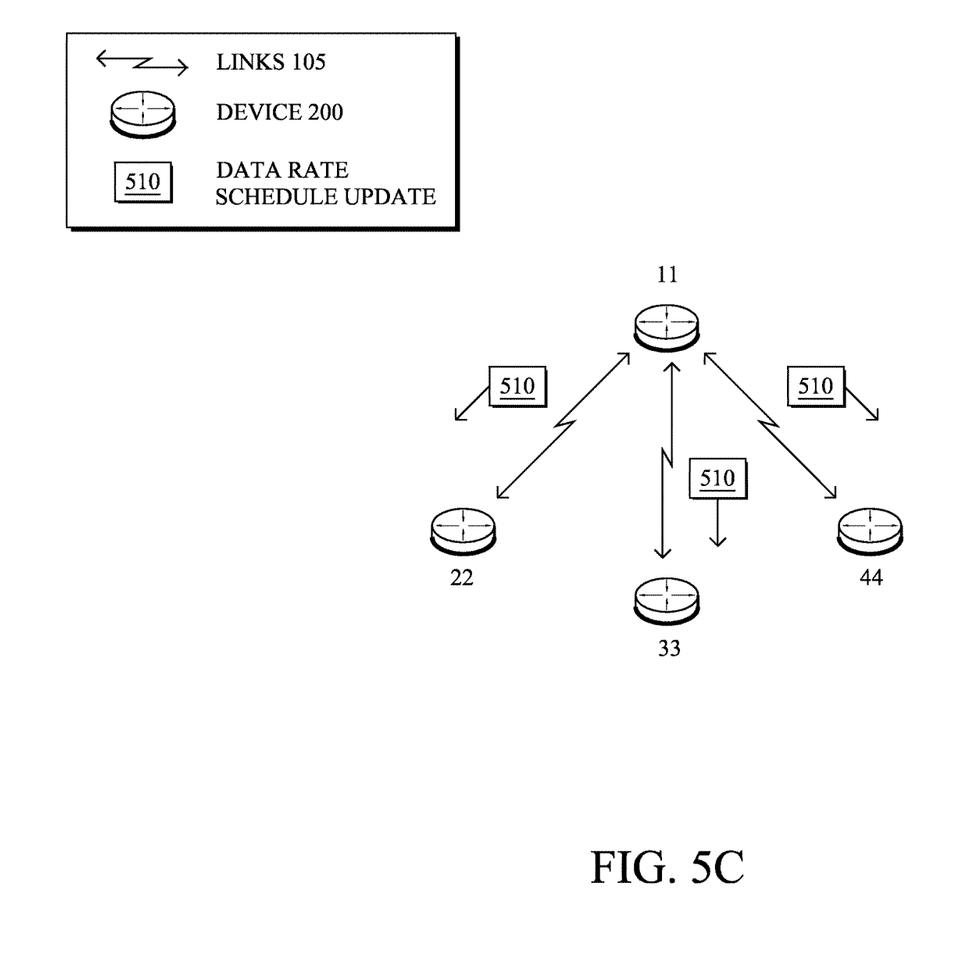

The data rate hopping schedule of a node/device may also be updated dynamically by the device, as shown in the example of FIGS. 5A-5C. In other words, the distribution of data rates being utilized in the data rate hopping schedule may be dynamically adjusted. In one embodiment, the data rate distribution may be adjusted locally by each device. For example, assume that device 11 is using the data rate hopping schedule shown in FIG. 4 and is receiving the vast majority of traffic on a given data rate (e.g., high data rate $r_1$), only a portion of traffic on another data rate (e.g., low data rate $r_2$), and receives no traffic on an even slower data rate (e.g., data rate $r_3$). In such a case, device 11 may adjust its data rate hopping schedule by increasing the fraction of slots assigned to the high data rate, etc. For example, as shown in FIG. 5B, device 11 may adjust its data rate hopping schedule to use the sequence of data rates 508 such that data rate $r_1$ us available two thirds of the time and data rate $r_2$ is available one third of the time.

In another embodiment, the data rate distribution in a given data rate hopping schedule may be adjusted based on communication with neighboring devices. This may be based on local link observations (e.g., number of ACK messages, local link throughput adjustments, etc.) or based on the queue length of the device. For example, a congested node with growing queues may dynamically request to adjust the transmission rate especially if the link error rate is good enough.

In one implementation, a device looking for network connectivity may transmit a beacon message, such as an IEEE 802.15.4e-2012 Enhanced Beacon. Neighboring devices receiving these messages may then choose to increase the fraction of low data rate slots used in their data rate hopping schedules, to increase communication range and overall connectivity. In another implementation, a device may send an explicit message asking to adjust the ratio of data rates used by another device.

Neighboring devices of a particular device may be provided notifications of a change made to the data rate hopping schedule used by the device. For example, as shown in FIG. 5C, device 11 may provide notifications 510 to its neighboring devices to notify these devices of the change made to its data rate hopping schedule. In various embodiments, a device making a change to its data rate hopping schedule may provide a notification to the NMS and/or Path Computation Engine (if either are in use) when a change in the data rate hopping change occurs. In some cases, the NMS or PCE may first validate such a change before allowing a particular node/device to change its own data rate hopping schedule (e.g., to enforce a localized or network wide performance metric).

In one embodiment, the notifying device may take a proactive approach to notification by transmitting one or more messages that provide the updated data rate hopping schedule to other devices in the network. For example, device 11 may send notifications 510 to neighboring devices 22, 33, and 44 in response to making a change to its data rate hopping schedule. In another embodiment, a device may take a reactive approach to notification by only sending the data rate hopping schedule update in response to receiving a message. For example, device 11 may only send a notification 510 to device 22 after receiving a message from device 22. In one implementation, a device may perform a discovery process if it believes its neighbor has changed the data rate hopping schedule. For example, device 22 may query device 11 if a data rate schedule change is suspected. In another implementation, the data rate hopping schedule may always include a "resync" schedule (e.g., a subset of slots that do not change regardless of changes to data rate hopping schedule). Such a resync schedule would allow neighboring devices to send requests for updates in the data rate hopping schedule after the change.

Figure 6A:
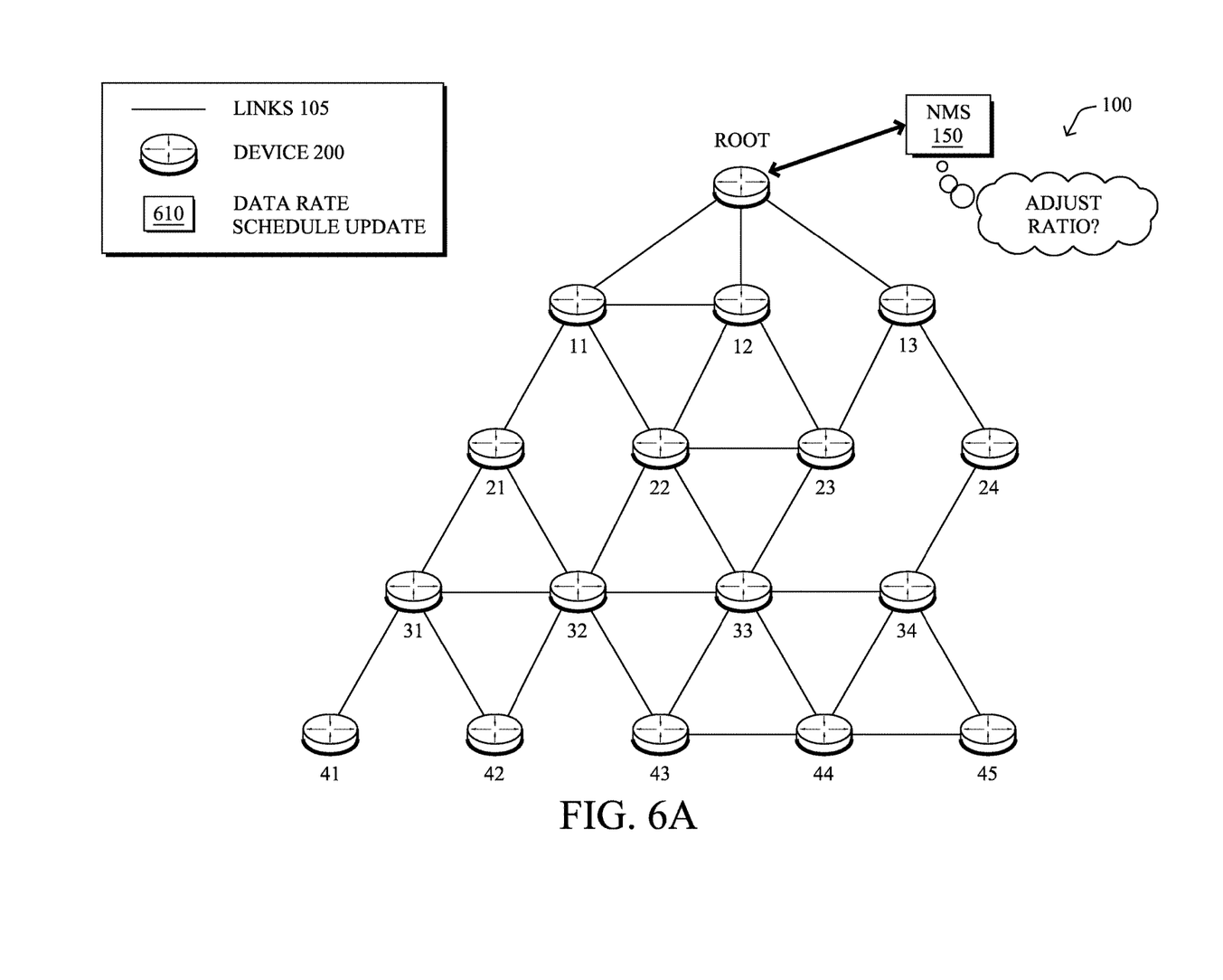
FIGS. 6A-6B illustrate an example of a network management server (NMS) adjusting the data rate of a network device/node.
Figure 6B:
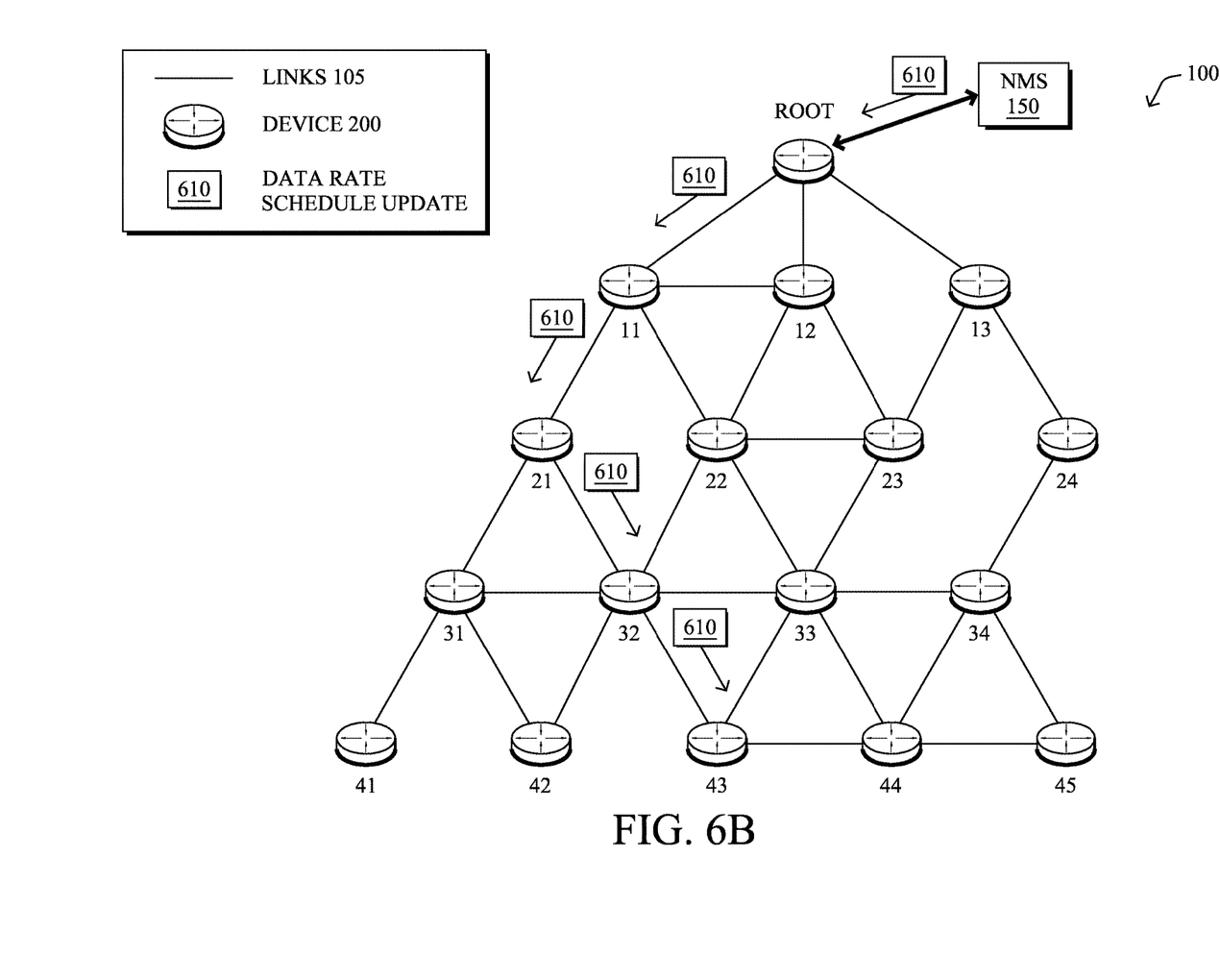

Data rate hopping schedules may also be set and adjusted by a central network device (e.g., a Field Area Router, PCE, NMS, etc.), as shown in the example of FIGS. 6A-6B. As shown, NMS 150 may determine that the ratio of data rates used in the data rate hopping schedule of device 11 requires adjustment. In such a case, NMS 150 may send a schedule update control command 610 to device 11 individually or to a group of devices in network 100. In response, device 11 and any other destination device for the control command may update its frequency rate hopping schedule.

In various embodiments, a neighboring device that communicates with a network device using a data rate hopping schedule may dynamically select which data rate to use when communicating with the network device. For example, neighboring device 22 may select which data rate(s) to use to communicate with device 11 based on the data rate hopping schedule of device 11. In some cases, a data rate hopping schedule allows a device to utilize more than one data rate when transmitting a packet. In one embodiment, a neighboring device attempts to utilize the data rate that minimizes channel utilization (e.g., one that minimizes Expected Transmission Overhead). In another embodiment, a device attempts to utilize the data rate that minimizes communication latency (e.g., the data rate that provides good link quality and is nearest in time). The choice of strategy may be a forwarder configuration applied to all packets or based on information contained within the packet (e.g. Traffic Class, Deep Packet Inspection, etc.), in various embodiments.

Figure 7:
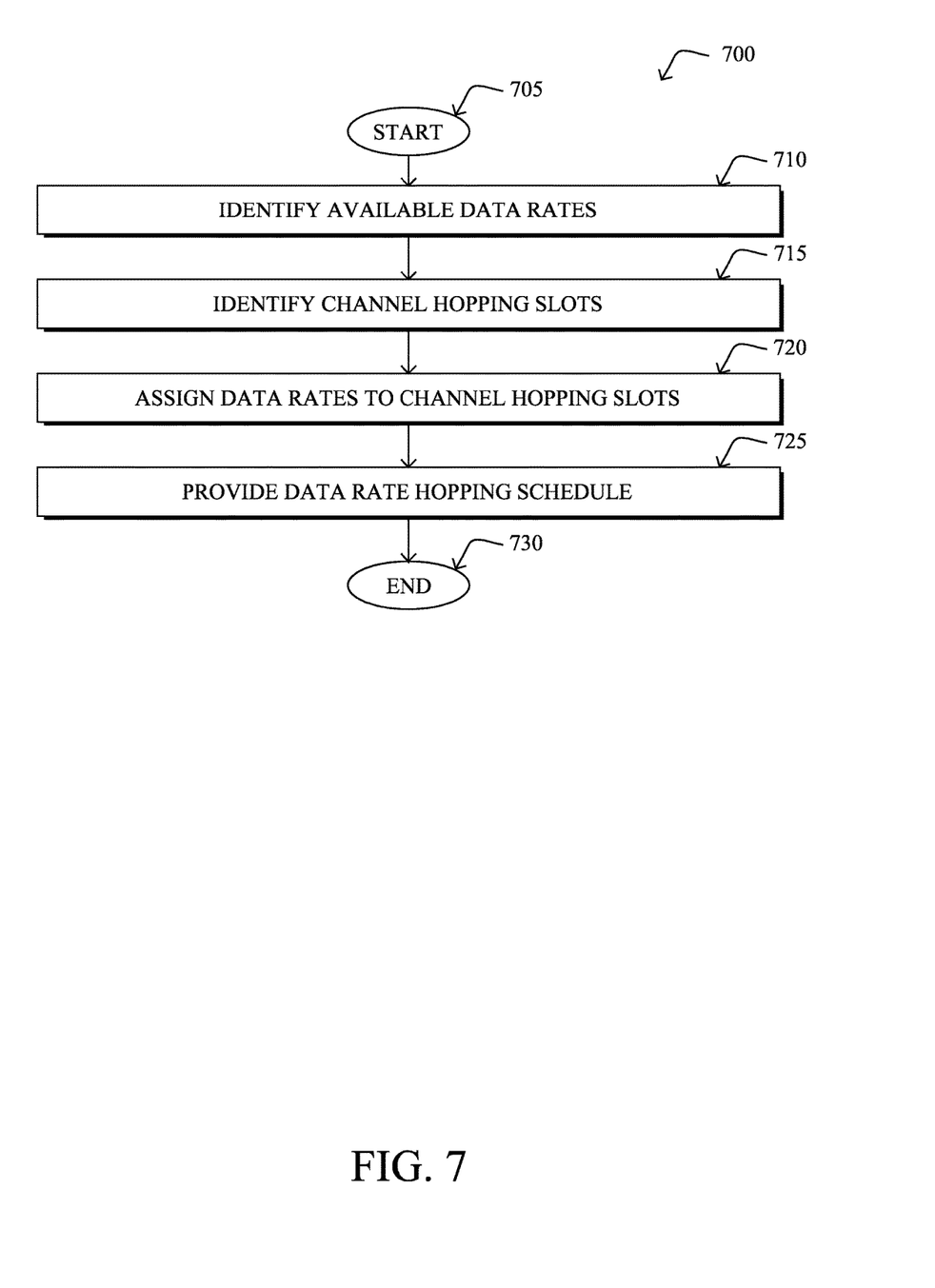
FIG. 7 illustrates an example simplified procedure for generating a data rate hopping schedule.

FIG. 7 illustrates an example simplified procedure 700 for generating a data rate hopping schedule, in accordance with one or more embodiments described herein.

Illustratively, procedure 700 may be performed by a network device in an LLN (e.g., device 11 in network 100) or a supervisory network device (e.g., a PCE, NMS, etc.). The procedure 700 may start at step 705, and continues to step 710, where, as described in greater detail above, a network device identifies data rates available for use by the device. For example, an IEEE 802.15.4g-2012 LLN device using FSK modulation may select between a low data rate of 50 kbps, a medium data rate of 100 kbps, and/or a high data rate of 200 kbps. The data rates available to a particular device may vary depending on the wireless communication band used by the device, the modulation type, communication standards, and other such factors.

At step 715, channel hopping slots are identified, as described above. For example, a channel hopping schedule may be used by a device to alter the frequency on which the device receives data. Within the schedule, frequencies are assigned to time slots. This assignment is used by both the receiving and transmitting devices to synchronize the frequency via which data is communicated to the receiving device.

At step 720, as detailed above, data rates are assigned to the channel hopping slots to generate a data rate hopping schedule. In other words, disparate data rates may be assigned to the time slots found within the channel hopping schedule of a device. Any number of techniques may be used to assign the data rates to the time slots, such as evenly distributing the different data rates within the schedule, using a pseudorandom function to assign the data rates (e.g., a Galois field, a Jenkins Hash function, etc.), based on an observed network metric, based on a target network performance metric, or the like.

At step 725, the data rate hopping schedule generated in step 720 is provided to one or more devices in the network, as detailed above. In the case where a supervisory device generates the data rate hopping schedule on behalf of a particular device, the supervisory device may provide the schedule to the particular device and/or any neighboring devices of the particular device. In the case of a network device generating its own data rate hopping schedule, such a schedule may be provided to any neighbors of the device to facilitate communication with the device. Procedure then ends at step 730.

Figure 8:
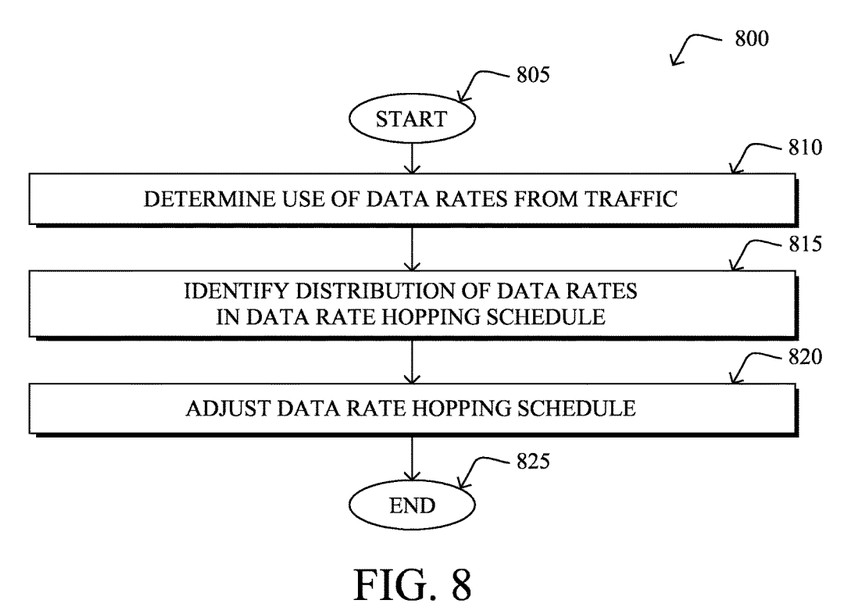
FIG. 8 illustrates an example simplified procedure for adjusting a data rate hopping schedule.

FIG. 8 illustrates an example simplified procedure 800 for adjusting a data rate hopping schedule. Like procedure 700, procedure 800 may be performed by an individual network device (e.g., a device configured to set its own data rate hopping schedule) or by a supervisory network device, such as an NMS). Procedure 800 starts at step 805 and continues on to step 810 where, as detailed above, the use of different data rates to communicate with a particular network device is determined from traffic to the device. For example, neighboring devices may use one data rate more than another to communicate with the particular device. Based on this traffic, the data rate usages may be determined.

At step 815, the distribution of data rates in the current data rate hopping schedule is determined, as detailed above. For example, the data rate hopping schedule for a particular network device may favor a particular data rate over another by a ratio of 2:1. In some embodiments, this information may be stored in a data rate hopping schedule table or another such data structure that is used to generate the hopping schedule used by the device.

At step 820, the data rate hopping schedule of the particular device is adjusted based on the current hopping schedule of the device and the observed traffic to the device. For example, assume that the current data rate hopping schedule used by a receiving device favors a particular data rate over another by a ratio of 2:1, yet traffic from its neighboring devices utilize the two data rates equally. In such a case, the data rate hopping schedule may be adjusted to use a 1:1 ratio of the data rates in accordance with the observed rate usages. Procedure 800 then proceeds to step 825 where it ends.

Figure 9:
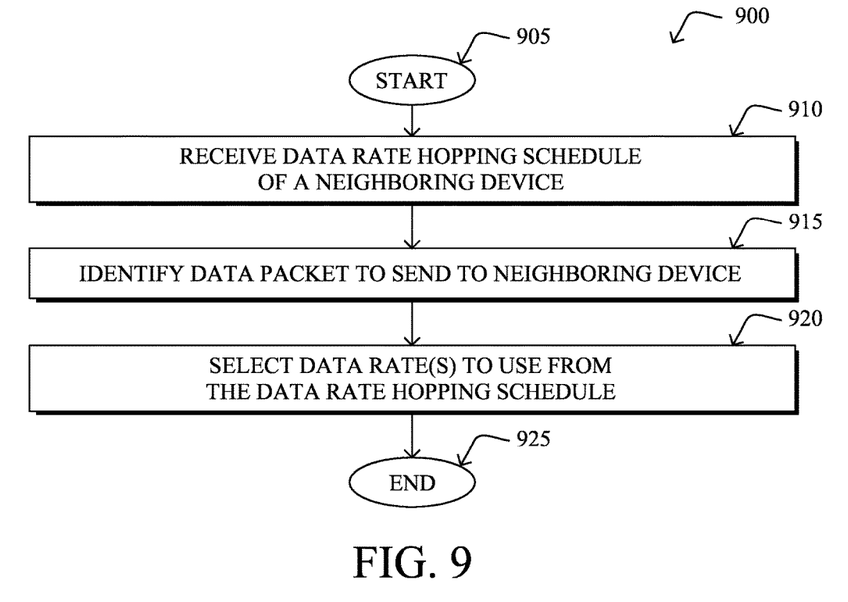
FIG. 9 illustrates an example simplified procedure for selecting one or more data rates to use within a data rate hopping schedule.

FIG. 9 illustrates an example simplified procedure 900 for selecting one or more data rates to use within a data rate hopping schedule. As detailed above, procedure 900 may be performed by any neighboring device of a device that uses a data rate hopping schedule (e.g., devices 22, 33, etc., as described above). Procedure 900 begins at step 905 and continues on to step 910 where, as detailed above, the data rate hopping schedule of the neighboring device is received by the transmitting device. At step 915, the transmitting device identifies a data packet to send to the neighboring device, as detailed above. For example, the packet may be a forwarding packet (e.g., a packet received by the transmitting device from another device), a packet originating from the transmitting device, etc. In some embodiments, the transmitting device may identify the type of packet from information stored in the header of the packet.

At step 920, one or more data rates are selected by the transmitting device from the data rate hopping schedule, as detailed above. Based on the type of packet to be sent, for example, the transmitting device may select which slots within the data rate hopping schedule are to be used to send the data packet to the receiving device. In other examples, the data rate(s) may be selected to reduce channel utilization, minimizes communication latency, or the like. Procedure 900 then ends at step 925.

It should be noted that while certain steps within procedures 700-900 may be optional as described above, the steps shown in FIGS. 7-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-900 are described separately, certain steps from each procedure may be incorporated into each other procedure, and the procedures are not meant to be mutually exclusive.

The techniques described herein, therefore, provide for the use of a mixed data rate by a device in a network, such as a mesh network, by use of a data rate hopping schedule. First, a data rate hopping schedule may increase overall network reliability by allowing a device to select different data rates when transmitting a packet to a neighboring device. Second, a data rate hopping schedule may also increase overall communication range by allowing devices to listen on low data rates, providing long-range connectivity to those neighbors that require it, and high data rates, providing improved throughput and latency for other neighbors that can utilize it. The combination of these advantages leads to an overall mesh networking solution that can simultaneously support relatively high capacity (by allowing higher data rates), long communication range (reducing the need for costly range extenders), and added reliability (by allowing devices to fall back to lower data rates when needed).

While there have been shown and described illustrative embodiments that provide for optimized unicast and broadcast schedules in a frequency hopping network, it is to be understood that various other adaptations and modifications may be made within the spirit and scope of the embodiments herein. For example, the embodiments have been shown and described herein with relation to wireless networks. However, the embodiments in their broader sense are not as limited, and may, in fact, be used with other types of shared media networks and/or protocols using frequency hopping, such as certain PLC protocols. Also, while the description above relates to packets, the techniques may be equally applicable to non-packetized transmissions. Moreover, while the above description is specifically discussed synchronized transmissions, it is possible to allow for various unsynchronized transmissions when it is desirable to do so.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    identifying, at a first device in a network, a plurality of data rates available for communication;
    identifying, by the first device, slots of a channel hopping schedule;
    determining, by the first device, a distribution of data rates for the plurality of data rates;
    assigning, by the first device, the plurality of data rates to the slots of the channel hopping schedule to generate a data rate hopping schedule based on the determined distribution of the plurality of data rates, wherein the plurality of data rates are mixed across the slots of the channel hopping schedule allowing the first device to have different data rates associated with different slots in the channel hopping schedule; and
    providing, by the first device, the data rate hopping schedule to a second device in the network.

2. The method as in claim 1, further comprising:
    analyzing networking traffic to determine utilization of the plurality of data rates for communication; and
    adjusting the data rate hopping schedule based on the utilization of the plurality of data rates for communication.

3. The method as in claim 1, further comprising:
    assigning the plurality of data rates to the slots of the channel hopping schedule using a pseudorandom function.

4. The method as in claim 1, further comprising:
    assigning a particular data rate from the plurality of data rates to the slots of the channel hopping schedule at periodic time intervals.

5. The method as in claim 1, wherein the data rate hopping schedule is provided to the second device in response to receiving a message from the second device.

6. The method as in claim 1, wherein the second device is a neighboring device of the first device in the network.

7. The method as in claim 1, further comprising:
    adjusting the data rate hopping schedule in response to receiving a beacon message.

8. The method as in claim 1, further comprising:
    adjusting the data rate hopping schedule based on a traffic queue length.

9. The method as in claim 1, wherein the first device is a field area router or a network management system.

10. The method as in claim 1, wherein the second device is a field area router or a network management system.

11. A method comprising:
receiving, at a device in a network, a data rate hopping schedule for a neighboring device, wherein the data rate hopping schedule mixes different data rates of a plurality of data rates across different slots of a channel hopping schedule according to a distribution of the data rates of the plurality of data rates determined by the neighboring device;
identifying a data packet to send to the neighboring device; and
selecting, by the device, one or more of the plurality of data rates from the data rate hopping schedule to send the packet to the neighboring device at each of the slots of the channel hopping schedule.

12. The method as in claim 11, further comprising:
selecting the one or more of the plurality of data rates from the data rate hopping schedule to minimize channel utilization.

13. The method as in claim 11, further comprising:
selecting the one or more of the plurality of data rates from the data rate hopping schedule to minimize communication latency.

14. An apparatus, comprising:
one or more network interfaces to communicate via a network;
a processor coupled to the network interfaces and adapted to execute one or more processes; and
a memory configured to store a process executable by the processor, the process when executed configured to:
identify a plurality of data rates available for communication by the one or more network interfaces;
identify slots of a channel hopping schedule;
determine a distribution of data rates for the plurality of data rates;
assign the plurality of data rates to the slots of the channel hopping schedule to generate a data rate hopping schedule based on the determined distribution of the plurality of data rates, wherein the plurality of data rates are mixed across the slots of the channel hopping schedule allowing the first device to have different data rates associated with different slots in the channel hopping schedule; and
provide the data rate hopping schedule to a particular device in the network.

15. The apparatus as in claim 14, wherein the process when executed is further configured to:
analyze networking traffic to determine utilization of the plurality of data rates for communication; and
adjust the data rate hopping schedule based on the utilization of the plurality of data rates for communication.

16. The apparatus as in claim 14, wherein the process when executed is further configured to:
assign the plurality of data rates to the slots of the channel hopping schedule using a pseudorandom function.

17. The apparatus as in claim 14, wherein the process when executed is further configured to:
assign a particular data rate from the plurality of data rates to the slots of the channel hopping schedule at periodic time intervals.

18. The apparatus as in claim 14, wherein the process when executed is further configured to:
adjust the data rate hopping schedule in response to receiving a beacon message.

19. The apparatus as in claim 14, wherein the process when executed is further configured to:
adjust the data rate hopping schedule based on a traffic queue length.

20. An apparatus, comprising:
one or more network interfaces to communicate via a network;
a processor coupled to the network interfaces and adapted to execute one or more processes; and
a memory configured to store a process executable by the processor, the process when executed configured to:
receive a data rate hopping schedule for a neighboring device, wherein the data rate hopping schedule mixes different data rates of a plurality of data rates across different slots of a channel hopping schedule according to a distribution of the data rates of the plurality of data rates determined by the neighboring device;
identify a data packet to send to the neighboring device; and
select one or more of the plurality of data rates from the data rate hopping schedule to send the packet to the neighboring device at each of the slots of the channel hopping schedule.

21. The apparatus as in claim 20, wherein the process when executed is further configured to:
selecting the one or more of the plurality of data rates from the data rate hopping schedule to minimize channel utilization.

22. The apparatus as in claim 20, wherein the process when executed is further configured to:
selecting the one or more of the plurality of data rates from the data rate hopping schedule to minimize communication latency.

* * * * *